United States Patent [19]

Byron

[11] Patent Number: 5,638,473

[45] Date of Patent: Jun. 10, 1997

[54] OPTICAL WAVEGUIDE GRATING FILTER

[75] Inventor: Kevin C. Byron, Bishop's Stortford, United Kingdom

[73] Assignee: Northern Telecom Limited, Montreal, Canada

[21] Appl. No.: 558,709

[22] Filed: Nov. 16, 1995

[30] Foreign Application Priority Data

Nov. 16, 1994 [GB] United Kingdom ............... 942365

[51] Int. Cl.$^6$ .................................................. G02B 6/34
[52] U.S. Cl. .................................................. 385/37
[58] Field of Search ................ 385/12, 37; 359/566; 372/6

[56] References Cited

U.S. PATENT DOCUMENTS

| | | | |
|---|---|---|---|
| 4,807,950 | 2/1989 | Glenn | 350/361 |
| 4,911,516 | 3/1990 | Palfrey et al. | 385/37 |
| 5,042,897 | 8/1991 | Meltz | 385/37 |
| 5,210,807 | 5/1993 | Ames | 385/24 |
| 5,384,884 | 1/1995 | Kashyap et al. | 385/37 X |

*Primary Examiner*—Akm E. Ullah
*Attorney, Agent, or Firm*—Lee, Mann, Smith, McWilliams, Sweeney & Ohlson

[57] ABSTRACT

The isolation between stop and pass bands afforded by an optical fibre normally reflective Bragg grating reflective over a waveband $\lambda_3$ is enhanced by preceding it with two blazed Bragg gratings that are spectrally selectively mode coupling respectively over wavebands $\lambda_1$ and $\lambda_2$, where the $\lambda_3$ waveband compasses the spectral waveband separating waveband $\lambda_1$ from waveband $\lambda_2$. The fibre is connected to an optical circulator or one port of an optical 4-port 3 dB coupler.

8 Claims, 4 Drawing Sheets

OPTICAL WAVEGUIDE GRATING FILTER

BACKGROUND OF THE INVENTION

This invention relates to optical waveguide grating filters and in particular to such filters that exhibit a relatively high degree of isolation between stop and pass bands.

A transmission type filter with a defined pass-band can be constructed in a length of single mode optical waveguide by creating in the waveguide two Bragg gratings providing stop-bands respectively on the long-wavelength side and the short wavelength side of the intended pass-band. These two Bragg gratings may be normally reflective Bragg gratings whose elements extend in parallel planes normal to the waveguide axis, in which case their stop-bands are created by reflection of light within those wavebands reversing the direction of propagation of the guided light. Alternatively, they may be blazed Bragg gratings whose grating elements extend in parallel planes inclined at an oblique angle to the waveguide axis, in which case their stop-bands are created by mode conversion of light propagating in the waveguide from the guided mode into an unguided, and hence radiating, mode or group of modes. By way of example, normally reflective Bragg gratings may be made in optical fibre waveguides by the method described in U.S. Pat. No. 4,725,110, and blazed Bragg gratings by the method described in U.S. Pat. No. 5,042,897. A transmission type filter of this type may be constructed to provide an isolation of about 30 dB between its stop and pass bands. A similar degree of isolation can be obtained in a reflective type filter in single mode waveguide by the use of a single normally reflective Bragg grating.

An example of an optical waveguide Bragg grating filter comprising an optical fibre provided with one or more normally reflective Bragg gratings is to be found for example in U.S. Pat. No. 5,283,686, and the use of blazed gratings for optical filter purposes in for example WO 92/24977.

SUMMARY OF THE INVENTION

The present invention is directed to the provision of a filter affording the possibility of improved isolation.

According to one aspect of the present invention there is provided a single mode optical waveguide filter which includes the series combination comprising two optical waveguide blazed Bragg gratings optically in tandem with an optical waveguide normally reflective Bragg grating, wherein the periodicities of the three Bragg gratings are such that the blazed gratings are spectrally selectively mode coupling respectively over spectrally separated wavebands $\lambda_1$ and $\lambda_2$ while the normally reflective grating is spectrally selectively reflecting over a waveband $\lambda_3$ which at least compasses the spectral waveband separating waveband $\lambda_1$ from waveband $\lambda_2$, which series combination is optically coupled with one port of an optical multiport device selected from the group consisting of an optical circulator and an optical 4-port 3 dB coupler.

It may be noted that the improved isolation afforded by such a structure is generated at least in part by the fact that the light transmitted by the filter makes a full double passage through each of the two blazed Bragg gratings.

Such improved isolation may for instance be required in filters for use in association with optical waveguide amplifiers for separating wanted signal from spontaneous emission noise. Another illustrative application is in wavelength division multiplexed (WDM) systems extending between one or more optical transmitters and receivers, and where the wavelength spacing of the multiplexed channels is found to be such that the side-lobes of a normally reflective Bragg filter designed for one channel register with, or at least extend into, the spectral bands of other channels. It will be appreciated that in some circumstances the presence of one of the side-lobes presents a problem, while that of the other does not. In such circumstances one of the blazed Bragg gratings can clearly be dispensed with.

Accordingly the invention also provides a single mode optical waveguide filter which includes the series combination comprising an optical waveguide blazed Bragg grating optically in tandem with an optical waveguide normally reflective Bragg grating wherein the periodicities of the two Bragg gratings are such that the blazed grating is spectrally selectively mode coupling over spectral waveband $\lambda_1$ while the normally reflective grating is spectrally selectively reflecting over a waveband $\lambda_3$ a side lobe of which extends into spectral waveband $\lambda_1$, which series combination is optically coupled with one port of an optical multiport device selected from the group consisting of an optical circulator and an optical 4-port 3 dB coupler.

According to a further aspect of the present invention there is provided a method of filtering an optical signal wherein the signal is fed through an optical multiport device, selected from the group consisting of an optical circulator and an optical 4-port 3 dB coupler, into an optical transmission path and traverses a first filter in the path effective to remove at least some unwanted wavelengths by reflecting them out of the transmission path, passing the signal to a second filter effective to reflect the wanted signal back through the first filter whereby to further remove unwanted wavelength from the transmission path before the signal is fed back through the multiport device.

The invention further provides a method of operating an optical transmission system which method of operation includes transmission of optical signals from at least one transmitter to at least one receiver through one or more filters in each of which filters the optical signals are fed through an optical multiport device, selected from the group consisting of an optical circulator and an optical 4-port 3 dB coupler, into an optical transmission path and traverses a first filter in the path effective to remove at least some unwanted wavelengths by reflecting them out of the transmission path, passing the signal to a second filter effective to reflect the wanted signal back through the first filter whereby to further remove unwanted wavelength from the transmission path before the signals are fed back through the multiport device.

The present invention obtains improved isolation in its filter characteristic by the use of a mixture of blazed and normally reflecting Bragg gratings. Such a mixture is known from US 5 166 940 in the different context of causing an erbium doped optical fibre amplifier to lase at a specific wavelength for gain-clamping purposes.

BRIEF DESCRIPTION OF THE DRAWINGS

There follows a description of optical fibre filters embodying the invention in preferred forms. The description refers to the accompanying drawings in which.

DETAILED DESCRIPTION OF PREFERRED EMBODIMENTS

Figure 1:
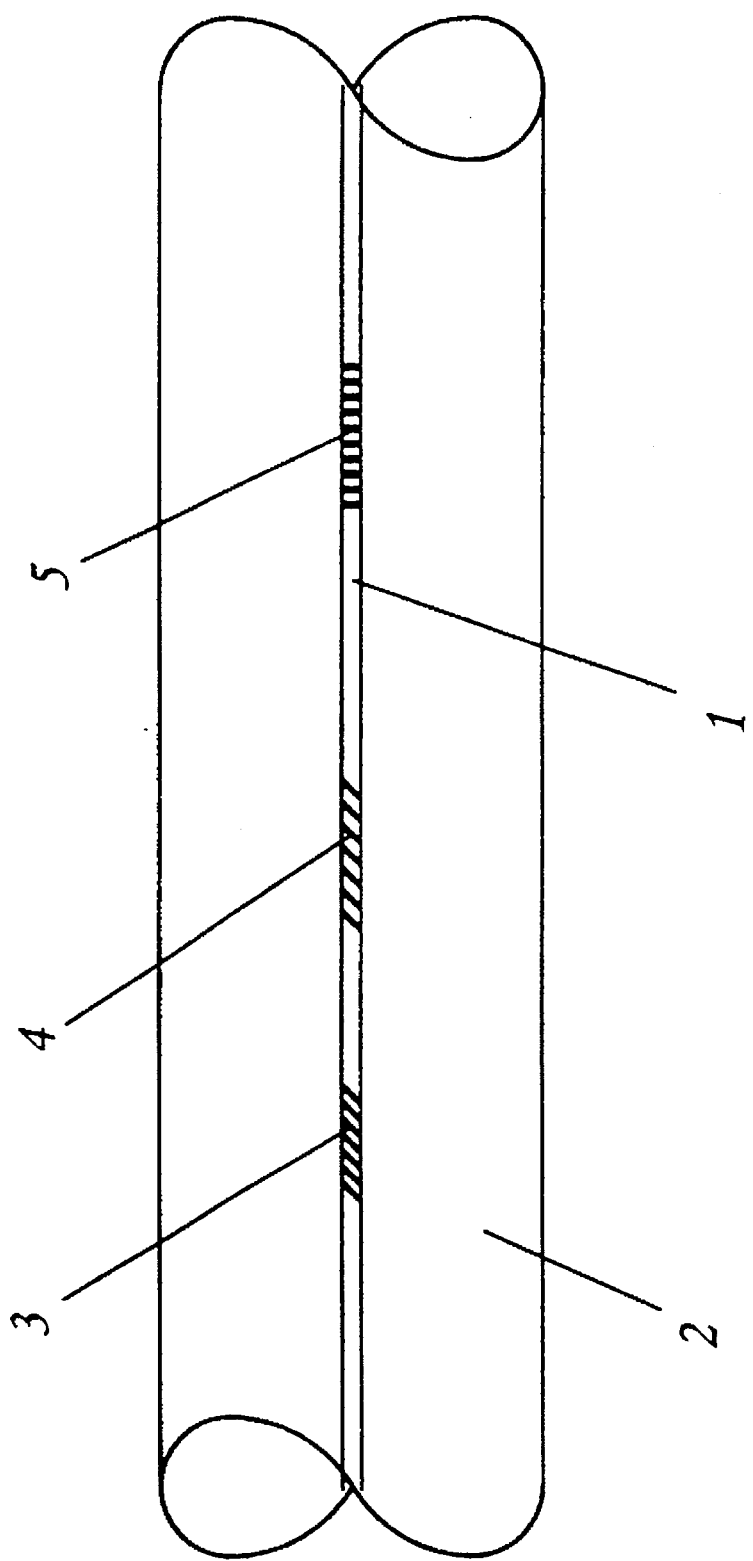
FIG. 1 schematically depicts a length of single mode fibre in which there is a series combination of two blazed Bragg gratings in tandem with a normally reflective Bragg grating.
Figure 2:
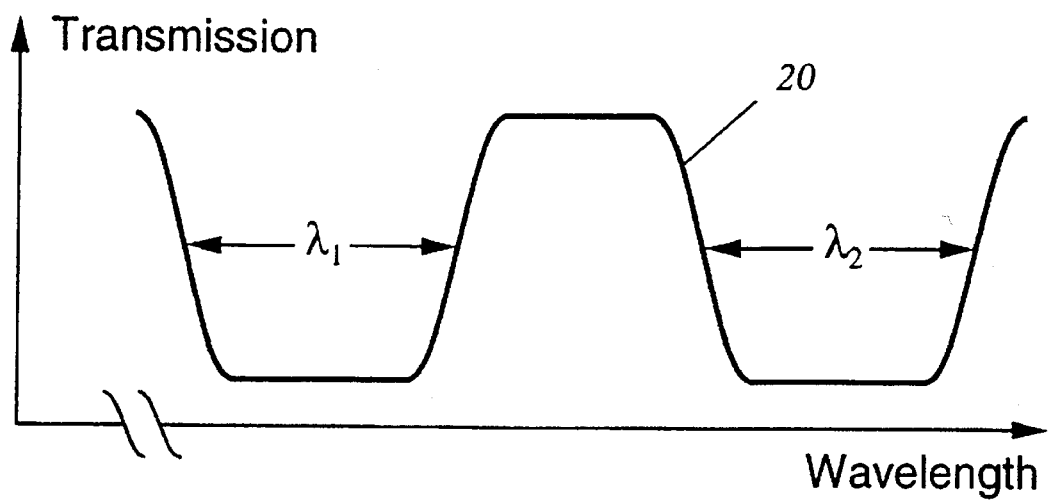
FIG. 2 schematically depicts the spectral transmission characteristics of the series combination of the two blazed Bragg gratings of FIG. 1.

Referring to FIG. 1, in the core 1 of a single mode fibre 2 are photo-induced two blazed Bragg gratings 3 and 4, and a normally reflective grating 5. The periodicities of blazed gratings 3 and 4 are such as to provide them with wavebands $\lambda_1$ and $\lambda_2$ (FIG. 2) over which they respectively couple light from the propagating mode guided by optical fibre 2 into radiating modes whose power is dissipated. Accordingly, for a single passage of light through the two blazed gratings 3 and 4, they provide a spectral transmission Characteristic as depicted by curve 20. Curve 39 shows the corresponding spectral reflection characteristic for the normally reflective Bragg grating 5. This Bragg grating, on its own, functions in reflection as a spectrally selective band-pass reflector reflective over a waveband $\lambda_3$, but typically the construction of such filters is liable to produce a spectral characteristic with side-bands 30a and 30b.

Figure 3:
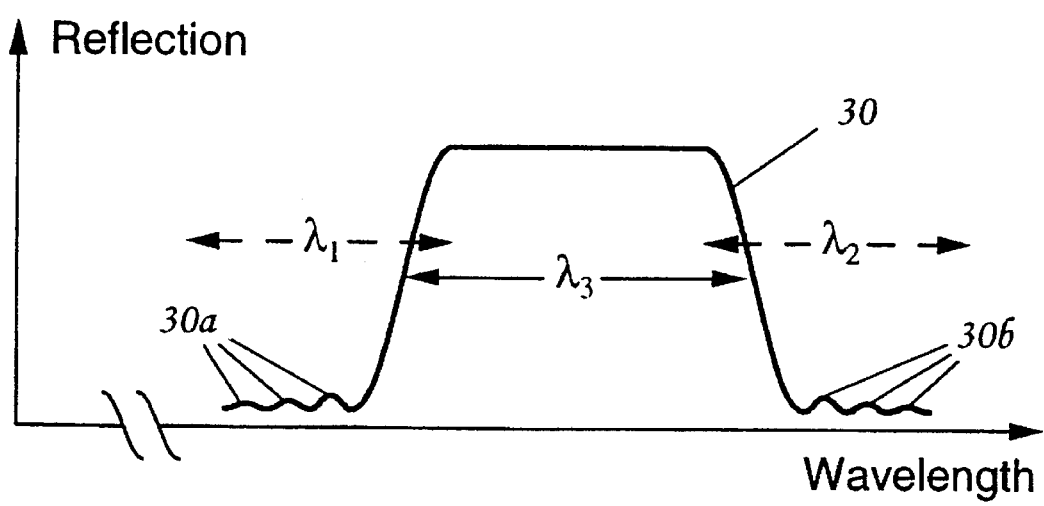
FIG. 3 schematically depicts the spectral reflection characteristics of the normally reflective grating of FIG. 1.

The construction of the Bragg grating 5 is such that the spectral waveband $\lambda_3$ over which it is selectively reflective at least compasses the waveband separating waveband $\lambda_1$ from waveband $\lambda_2$, and may be, as depicted in FIG. 3, slightly larger than this. The wavebands $\lambda_1$ and $\lambda_2$ of Bragg gratings 3 and 4 are preferably chosen to compass respectively the side-bands 30a and 30b. In this way, light launched into optical fibre 2 from the end nearest grating 3 the combination exhibits a spectral reflection characteristic in which the spectral discrimination of curve 30 provided by the spectral reflective characteristic of grating 5 is twice enhanced by the spectral discrimination of curve 20 provided by the spectral transmission characteristic of gratings 3 and 4.

Figure 4:
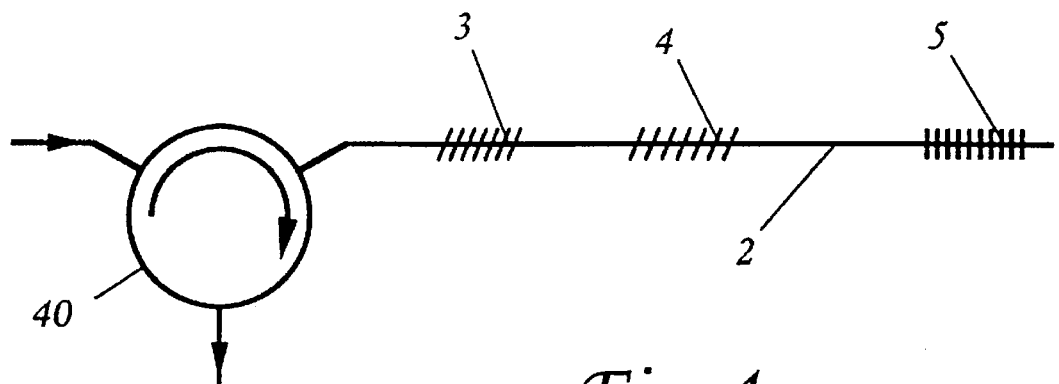
FIGS. 4 and 5 schematically depict the fibre of FIG. 1 optically coupled respectively with a three-pod optical circulator and with a four-port 3 dB tapered fused coupler.
Figure 5:
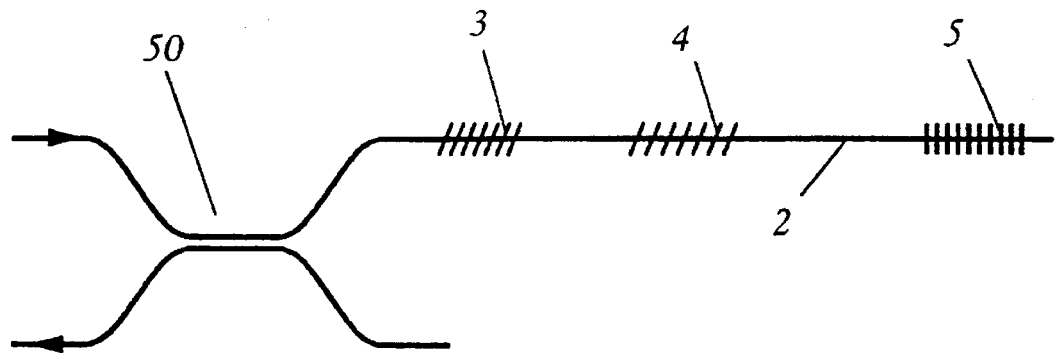
Figure 6:
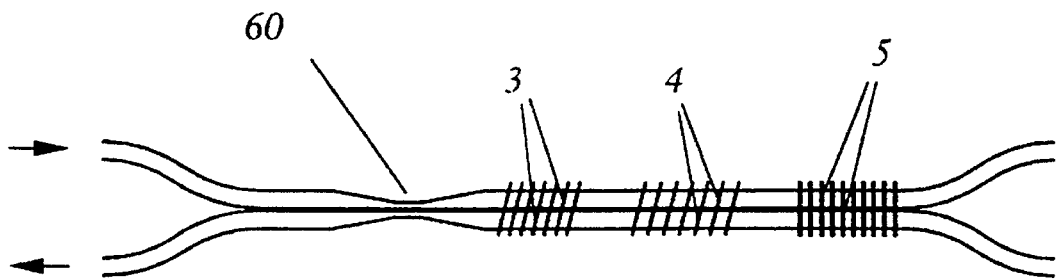
FIG. 6 depicts a filter comprising a 3 dB tapered fused fibre coupler with the arrangement of three Bragg gratings as in FIG. 1 in both fibres on one side of its coupling region.

For use as a transmission type filter, the end of the combination nearer grating 3 is connected to a circulator 40 as depicted in FIG. 4, or to one port of a 4-port 3 dB optical coupler 50 as depicted in FIG. 5. This coupler 50 may conveniently be constituted by a single mode tapered fused optical fibre type 3 dB coupler. The arrangement of FIG. 5 provides an additional 6dB loss which can be avoided by a Mach Zehnder type arrangement as depicted in FIG. 6 in which identical grating elements 3, 4 and 5 are located in both fibres of a 3 dB tapered fused coupler 60. In the case of the normally reflective gratings 5, it will be appreciated the light reflected by these gratings will interfere, and hence the phase relationship between the two reflected signals is critical in ensuring that when they interfere, they do so in a manner that directs substantially no output power back into the input port. Such a phase relationship can be ensured by the method described in the specification of United Kingdom Patent Application Serial No. 2 283 831 that involves creating the gratings in both fibres Simultaneously at a point in the coupler where the two fibres remain tacked together in side-by-side contact so that the resulting gratings are automatically formed optically equidistant from the coupling region of the coupler.

Figure 7:
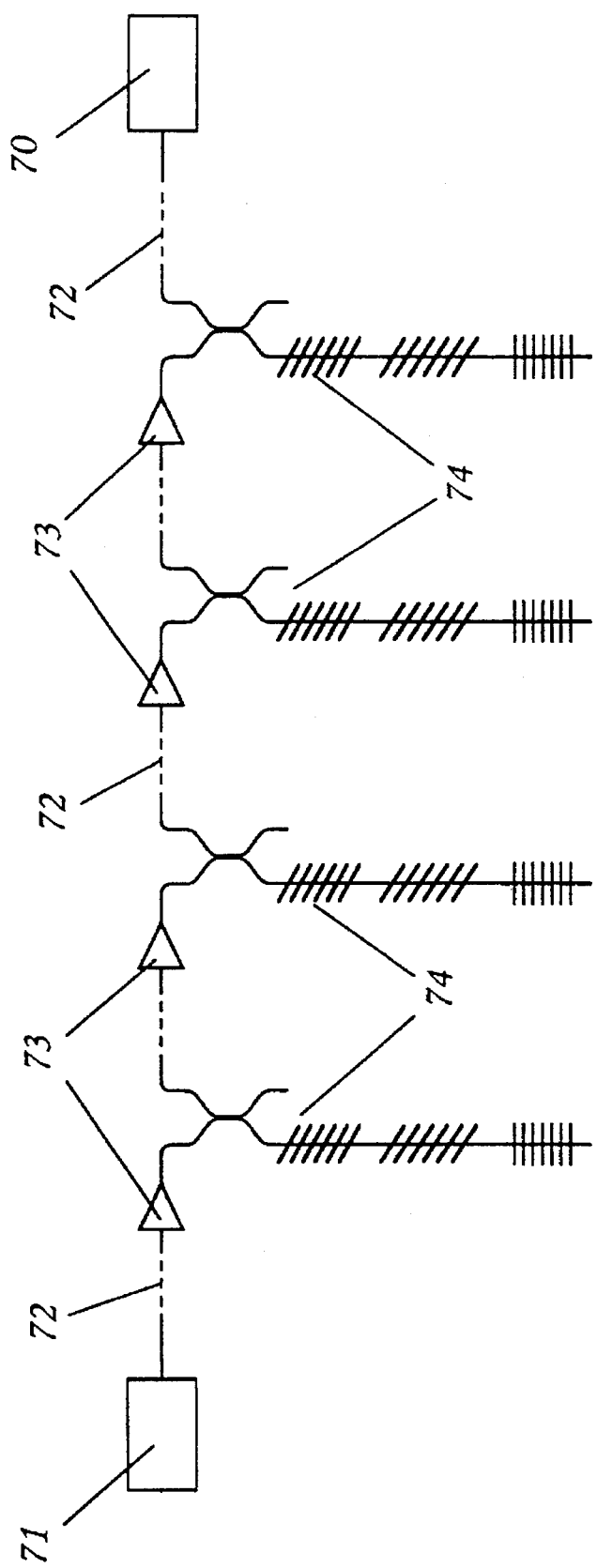
FIG. 7 depicts an optical transmission system incorporating a plurality of the filters of FIG. 5.

In FIG. 7 there is schematically depicted an optical transmission system having an optical receiver 70 optically coupled to an optical transmitter 71 by means of a transmission path 72 that includes a plurality of optical amplifiers 73 and associated filters 74 constructed in accordance with the teachings of the present invention, for instance a filter as described above with particular reference to FIG. 5.

I claim:

1. A single mode optical waveguide filter which includes a series combination including an optical waveguide blazed Bragg grating optically in tandem with an optical waveguide normally reflective Bragg grating wherein the periodicities of the two Bragg gratings are such that the blazed grating is spectrally selectively mode coupling over spectral waveband $\lambda_1$ while the normally reflective grating is spectrally selectively reflecting over a waveband $\lambda_3$ a side lobe of which extends into spectral waveband $\lambda_1$, which series combination is optically coupled with one port of an optical multiport device selected from the group consisting of an optical circulator and an optical 4-port 3 dB coupler.

2. An optical waveguide filter as claimed in claim 1, wherein the multiport device is a 3 dB tapered fused optical fibre coupler.

3. An optical waveguide filter as claimed in claim 1, wherein the series combination comprises two optical waveguide blazed Bragg gratings optically in tandem with an optical waveguide normally reflective Bragg grating wherein the periodicities of the three Bragg gratings are such that the blazed gratings are spectrally selectively mode coupling respectively over spectrally separated wavebands $\lambda_1$ and $\lambda_2$ while the normally reflective grating is spectrally selectively reflecting over a waveband $\lambda_3$ which at least compasses the spectral waveband separating waveband $\lambda_1$ from waveband $\lambda_2$.

4. An optical waveguide filter as claimed in claim 3, wherein the multiport device is a 3 dB tapered fused optical fibre coupler.

5. An optical fibre filter including a 3 dB tapered fused optical fibre coupler having an optical coupling region formed between a pair of single mode fibres, on one side of which coupling region, in both fibres is formed a series combination including an optical fibre blazed Bragg grating optically in tandem with an optical waveguide normally reflective Bragg grating, wherein the periodicities of the two Bragg gratings are such that the blazed grating is spectrally selectively mode coupling over spectral waveband $\lambda_1$ while the normally reflective grating is spectrally selectively reflecting over a waveband $\lambda_3$ a side lobe of which extends into spectral waveband $\lambda_1$.

6. An optical waveguide filter as claimed in claim 5, wherein the series combination comprises two optical fibre blazed Bragg gratings optically in tandem with an optical waveguide normally reflective Bragg grating, wherein the periodicities of the three Bragg gratings are such that the blazed gratings are spectrally selectively mode coupling respectively over spectrally separated wavebands $\lambda_1$ and $\lambda_2$ while the normally reflective grating is spectrally selectively reflecting over a waveband $\lambda_3$ which at least compasses the spectral waveband separating spectral waveband $\lambda_1$ from spectral waveband $\lambda_2$.

7. A method of filtering an optical signal wherein the signal is fed through an optical multiport device, selected from the group consisting of an optical circulator and an optical 4-port 3 dB coupler, into an optical transmission path and traverses a first filter in the path effective to remove at least some unwanted wavelengths by reflecting them out of the transmission path, passing the signal to a second filter effective to reflect the wanted signal back through the first filter whereby to further remove unwanted wavelength from the transmission path before the signal is fed back through the multiport device.

8. A method of operating an optical transmission system which method of operation includes transmission of optical signals from at least one transmitter to at least one receiver through one or more filters in each of which filters the optical signals are fed through an optical multiport device, selected from the group consisting of an optical circulator and an optical 4-port 3 dB coupler, into an optical transmission path and traverse a first filter in the path effective to remove at least some unwanted wavelengths by reflecting them out of the transmission path, passing the signals to a second filter effective to reflect the wanted signals back through the first filter whereby to further remove unwanted wavelength from the transmission path before the signals are fed back through the multiport device.

* * * * *